US010305767B2

(12) United States Patent
Kollar et al.

(10) Patent No.: US 10,305,767 B2
(45) Date of Patent: May 28, 2019

(54) METHODS AND APPARATUSES FOR MEASUREMENT OF PACKET DELAY IN UPLINK IN E-UTRAN

(71) Applicant: Nokia Solutions and Networks Oy, Espoo (FI)

(72) Inventors: Martin Kollar, Kosice (SK); Yi Zhi Yao, Beijing (CN); Malgorzata Tomala, Wroclaw (PL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/214,662

(22) Filed: Jul. 20, 2016

(65) Prior Publication Data
US 2017/0034025 A1 Feb. 2, 2017

Related U.S. Application Data

(60) Provisional application No. 62/197,787, filed on Jul. 28, 2015.

(51) Int. Cl.
H04L 12/26 (2006.01)
H04W 28/02 (2009.01)
H04W 24/08 (2009.01)

(52) U.S. Cl.
CPC ..... H04L 43/0852 (2013.01); H04W 28/0268 (2013.01); H04W 24/08 (2013.01)

(58) Field of Classification Search
CPC .. H04L 43/0852; H04L 24/08; H04L 28/0268
See application file for complete search history.

(56) References Cited

U.S. PATENT DOCUMENTS

2009/0196275 A1 8/2009 Damnjanovic et al.
2010/0002630 A1* 1/2010 Park ...................... H04L 1/1812
370/328

(Continued)

FOREIGN PATENT DOCUMENTS

CN 1661953 A 8/2005
CN 1716882 A 1/2006
WO WO 2010/053252 A3 7/2010

OTHER PUBLICATIONS

"New Study Item Proposal: Further Enhancements of Minimization of Drive Tests for E-UTRAN", 3GPP TSG RAN Meeting #67, RP-150472, Agenda Item: 13.1.2, CMCC, Mar. 9-12, 2015, 8 pages.

(Continued)

Primary Examiner — Khaled M Kassim
(74) Attorney, Agent, or Firm — Squire Patton Boggs (US) LLP

(57) ABSTRACT

Systems, methods, apparatuses, and computer program products for packet delay measurement are provided. One method may include sending, by a network node, a grant in uplink to a user equipment that previously indicated a need for data transmission for quality of service (QoS) class identifier (QCI) services. The method may then include storing a time of the uplink grant to the user equipment, and measuring a time point when a last part of a packet data convergence protocol (PDCP) serving data unit (SDU) related to QCI services has been confirmed by sending an acknowledgement to the user equipment.

7 Claims, 4 Drawing Sheets

(56) References Cited

U.S. PATENT DOCUMENTS

| | | | |
|---|---|---|---|
| 2010/0246517 A1* | 9/2010 | Pradas | H04W 72/0413 370/329 |
| 2010/0322185 A1* | 12/2010 | Park | H04W 72/085 370/331 |
| 2011/0205997 A1* | 8/2011 | Chun | H04L 5/0007 370/329 |
| 2011/0274069 A1* | 11/2011 | Cho | H04W 72/0413 370/329 |
| 2012/0320837 A1* | 12/2012 | Kim | H04W 72/042 370/329 |
| 2013/0039272 A1* | 2/2013 | Chen | H04W 72/042 370/328 |
| 2013/0242726 A1* | 9/2013 | Zhu | H04W 72/0413 370/229 |
| 2015/0223093 A1* | 8/2015 | Zhang | H04W 24/10 370/252 |
| 2016/0323762 A1* | 11/2016 | Adachi | H04W 16/18 |
| 2017/0013485 A1* | 1/2017 | Chang | H04W 24/04 |
| 2017/0048912 A1* | 2/2017 | Sharma | H04L 43/00 |
| 2018/0020449 A1* | 1/2018 | Lee | H04W 4/90 |
| 2018/0041413 A1* | 2/2018 | Yi | H04L 43/0852 |

OTHER PUBLICATIONS

"3rd Generation Partnership Project;Technical Specification Group Radio Access Network;Evolved Universal Terrestrial Radio Access (E-UTRA);Layer 2—Measurements (Release 12)", 3GPP TS 36.314, V12.0.0, Sep. 2014, pp. 1-20.

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 12)", 3GPP TS 37.320, V12.2.0, Sep. 2014, pp. 1-25.

"Consideration on UL Delay Measurement", 3GPP TSG-RAN WG2 Meeting #90, R2-152490, Agenda item: 7.8, Qualcomm Incorporated, May 25-29, 2015, 2 pages.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.5.0, Mar. 2015, pp. 1-445.

"3rd Generation Partnership Project; Technical Specification Group Services and System Aspects; Telecommunication management; Performance Management (PM); Performance measurements Evolved Universal Terrestrial Radio Access Network (E-UTRAN) (Release 13)", 3GPP TS 32.425, V13.2.0, Jun. 2015, pp. 1-77.

"3rd Generation Partnership Project;Technical Specification Group Radio Access Network;Evolved Universal Terrestrial Radio Access (E-UTRA);Physical layer procedures (Release 12)", 3GPP TS 36.213, V12.6.0, Jun. 2015, pp. 1-241.

* cited by examiner

METHODS AND APPARATUSES FOR MEASUREMENT OF PACKET DELAY IN UPLINK IN E-UTRAN

CROSS-REFERENCE TO RELATED APPLICATIONS

This application claims priority from U.S. Provisional Application No. 62/197,787, filed on Jul. 28, 2015. The entire contents of this earlier filed application are hereby incorporated by reference in their entirety.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), future 5G radio access technology, and/or High Speed Packet Access (HSPA).

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided in the evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN provides a new radio access technology and refers to the improvements of UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One of the key features of LTE-A, introduced in LTE Rel-10, is carrier aggregation, which allows for increasing the data rates through aggregation of two or more LTE carriers, e.g., to the transmission bandwidth of up to 100 MHz. LTE-A in later releases may include even wider bandwidths as specified so far. Further, aggregating or interworking on the radio access level with the wireless LAN (WLAN) access network is foreseen.

SUMMARY

One embodiment is directed to a method that includes, when a PDCP SDU (i) with a QCIx arrives at PDCP upper SAP, retaining or storing a time of arrival of the PDCP SDU (i) at a UE. The method may then include checking whether UL grant has been received for the PDCP SDU (i) with the QCIx and, if the UL grant has been received, retaining or storing a time or receipt of the UL grant. The method may also include calculating UL retention delay based on the time of receiving the UL grant and the time of arrival of the PDCP SDU. In an embodiment, the calculating may include calculating the UL retention delay according to the following formula: T_ULdelay QCIx(i)=t_Grant QCIx (i)−t_Arrival QCIx(i). The method may further include reporting, to an eNB, a sum of all retention delay periods for all the transmitted PDCP SDUs in UL direction for the QCIx.

Another embodiment is directed to an apparatus that includes, when a PDCP SDU (i) with a QCIx arrives at PDCP upper SAP, a storage unit configured to store the time of arrival of the PDCP SDU (i). The apparatus also includes a determining unit configured to check whether a UL grant has been received from the PDCP SDU (i) with the QCIx. If the UL grant has been received, the storage unit 420 is configured to store the time of receipt of the UL grant. In an embodiment, the apparatus may also include a calculating unit configured to calculate UL retention delay based on the time of receipt of the UL grant and the time of arrival of the PDCP SDU (i). According to one embodiment, the calculating unit may calculate the UL retention delay according to the following equation: T_ULdelay QCIx(i)=t_Grant QCIx (i)−t_Arrival QCIx(i). The apparatus may also include a transceiving unit configured to report, to an eNB, the sum of all retention delay periods (T_ULdelay QCIx(i)) for all the transmitted PDCP SDUs in UL direction for the QCIx.

Another embodiment is directed to a computer program, embodied on a non-transitory computer readable medium. The computer program is configured to control a processor to perform a process which may include, when a PDCP SDU (i) with a QCIx arrives at PDCP upper SAP, retaining or storing a time of arrival of the PDCP SDU (i). The process may then include checking whether UL grant has been received for the PDCP SDU (i) with the QCIx and, if the UL grant has been received, retaining or storing a time or receipt of the UL grant. The process may also include calculating UL retention delay based on the time of receiving the UL grant and the time of arrival of the PDCP SDU. In an embodiment, the calculating may include calculating the UL retention delay according to the following formula: T_ULdelay QCIx(i)=t_Grant QCIx(i)−t_Arrival QCIx(i). The process may further include reporting, to an eNB, a sum of all retention delay periods for all the transmitted PDCP SDUs in UL direction for the QCIx.

Another embodiment is directed to a method that may include sending (or checking whether), by an eNB, a grant in UL to a UE that previously indicated need for data transmission for QCIx services. The method may also include retaining or storing the time of the grant, and measuring the time point when a last part of PDCP SDU (i) related to the QCIx has been confirmed via sending HARQ ACK to the UE by the eNB. The method may also include calculating UL delay based on the measured time point and the time of grant. The calculating may include calculating the UL delay according to the following equation: T_eNB ULdelay QCIx(i)=t_Last Piece QCIx(i)−t_Grant QCIx(i). The method may further include calculating an averaged UL PDCP SDU delay per QCI as follows: Sum(T_ULdelay QCIx(i))+sum(T_eNB ULdelay QCIx(i)) over all the UEs and PDCP SDU frames with the QCIx characteristic and divide this value with the number of PDCP SDUs with QCIx in UL direction.

Another embodiment is directed to an apparatus including a sending unit configured to send (or checking whether) a grant in UL to a UE that previously indicated need for data transmission for QCIx services. The apparatus may also include a storing unit configured to retain or store the time of the grant, and a measuring unit configured to measure the time point when a last part of PDCP SDU (i) related to the QCIx has been confirmed via sending HARQ ACK to the UE by the apparatus. The apparatus may also include a calculating unit configured to calculate UL delay based on the measured time point and the time of grant. The calculating unit may be configured to calculate the UL delay according to the following equation: T_eNB ULdelay QCIx (i)=t_Last Piece QCIx(i)−t_Grant QCIx(i). The calculating unit may be further configured to calculate an averaged UL PDCP SDU delay per QCI as follows: Sum(T_ULdelay QCIx(i))+sum(T_eNB ULdelay QCIx(i)) over all the UEs and PDCP SDU frames with the QCIx characteristic and divide this value with the number of PDCP SDUs with QCIx in UL direction.

Another embodiment is directed to a computer program, embodied on a non-transitory computer readable medium. The computer program is configured to control a processor to perform a process which may include sending (or checking whether) a grant in UL to a UE that previously indicated need for data transmission for QCIx services. The process may also include retaining or storing the time of the grant, and measuring the time point when a last part of PDCP SDU (i) related to the QCIx has been confirmed via sending HARQ ACK to the UE by the eNB. The process may also include calculating UL delay based on the measured time point and the time of grant. The calculating may include calculating the UL delay according to the following equation: T_eNB ULdelay QCIx(i)=t_Last Piece QCIx(i)−t_Grant QCIx(i). The process may further include calculating an averaged UL PDCP SDU delay per QCI as follows: Sum(T_ULdelay QCIx(i))+sum(T_eNB ULdelay QCIx(i)) over all the UEs and PDCP SDU frames with the QCIx characteristic and divide this value with the number of PDCP SDUs with QCIx in UL direction.

BRIEF DESCRIPTION OF THE DRAWINGS

For proper understanding of the invention, reference should be made to the accompanying drawings, wherein.

DETAILED DESCRIPTION

Figure 1:
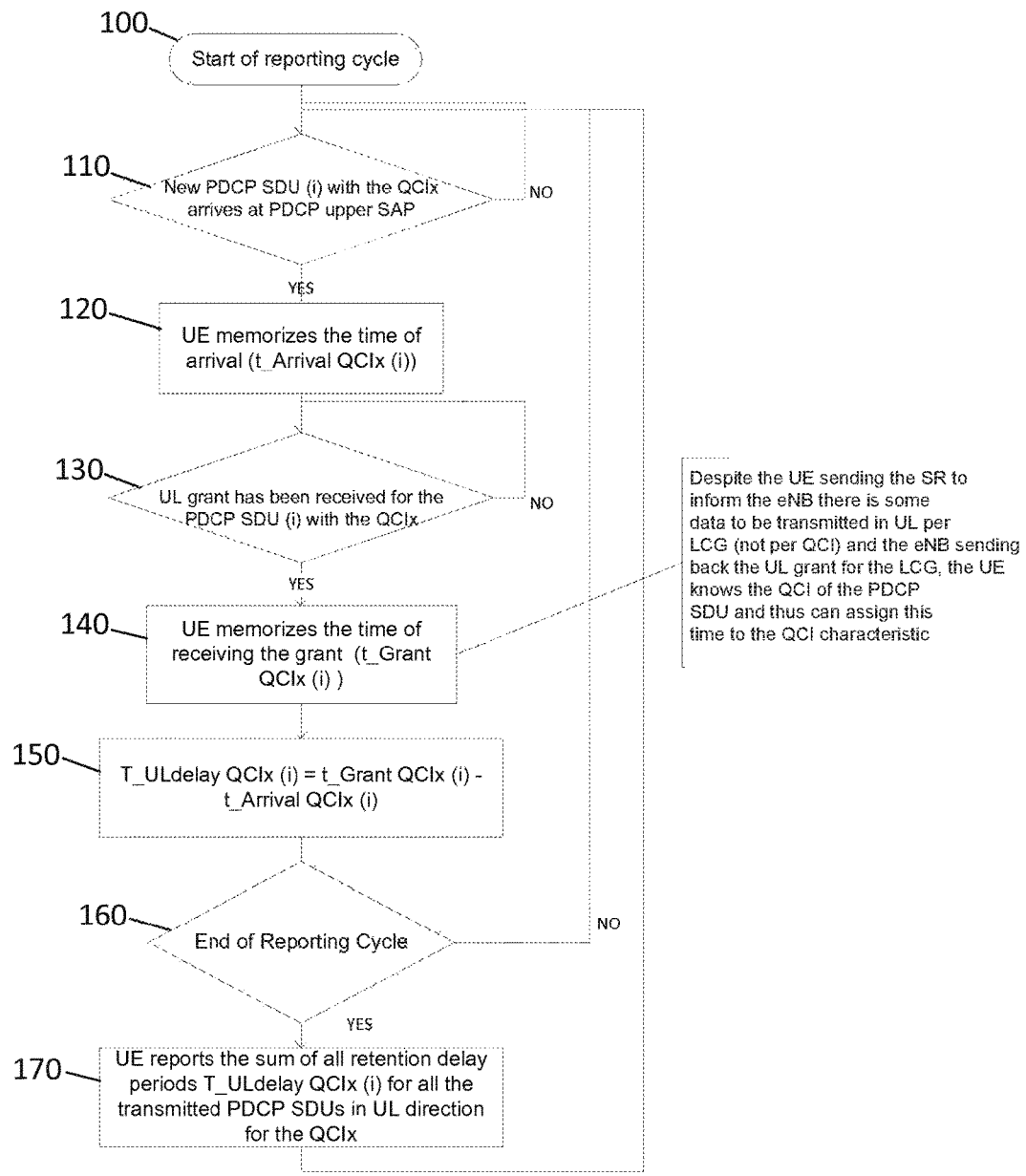
FIG. 1 illustrates a flow diagram of a method according to an embodiment.

It will be readily understood that the components of the invention, as generally described and illustrated in the figures herein, may be arranged and designed in a wide variety of different configurations. Thus, the following detailed description of embodiments of systems, methods, apparatuses, and computer program products for packet delay measurement, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Some embodiments are directed to methods for measurement of the packet data convergence protocol (PDCP) serving data unit (SDU) delay in uplink (UL) in evolved universal terrestrial access network (E-UTRAN). An embodiment may relate to 3GPP and looks at the issue of improving the quality of service (QoS) verification as an enhancement for the minimization of drive tests. Specifically, embodiments provide a mechanism that allows for a transmitter to keep track of the PDCP SDU delay measurements in the uplink direction. Embodiments aim to move the implementation complexity necessary for taking these measurements from the UE to the eNB. According to an embodiment, a UE's measurement of the retention time delay is transmitted to its eNB, and will then trigger the eNB to perform additional measurements for determining an average uplink delay.

In the framework of a currently ongoing 3GPP Study Item (RP-150472): "Further Enhancements of Minimization of Drive Tests (FeMDT)", 3GPP is discussing improvements for QoS verification. An objective is to define a method to measure end user QoS, in particular for guaranteed bit rate (GBR) traffic type in order to understand QoS and its limiting factors. This work is a continuation of the 3GPP Release-12 MDT feature, which resulted in defining new metrics: Scheduled IP Throughput and Data Volume. The Release-12 functionality provides means, however, to assess non-GBR related traffic and hence does not offer a good assessment of multi-media telephony (MMTEL) voice/video services.

PDCP SDU delay is one of the key factors impacting the Quality of Experience (QoE) perceived by the end user. According to 3GPP, each QoS class identifier (QCI) characteristic has defined a maximum tolerable packet delay. The metric has been recognized under FeMDT work as essential indicator for GBR traffic assessment.

For the actual delay measurement, the Packet Delay in the downlink (DL) per QCI in 3GPP TS 36.314 [1] requires the transmitter to keep track of PDCP SDU up to the point where the last piece of the PDCP SDU was received by the receiver based on hybrid automatic repeat request (HARQ) feedback. To follow the same principles in the UL direction would be overly complex for UE implementation and may affect the availability of the overall feature in the market. Accordingly, embodiments provide a new method that does not require the complex implementation in UE.

An embodiment aims to solve the issue(s) mentioned above via moving the implementation complexity from the UE to the eNB. In order to keep the impact to the UE at reasonable level, the total UL latency consists of two factors: (1) retention time delay within the UE (measured and reported by UE), and (2) HARQ loop delay measured by the eNB. In an embodiment, UE input is taken by the eNB as a trigger for further complementary calculation of Total Delay in UL. According to one embodiment, the division line between what part of the delay is measured by the UE and what part is measured by the eNB is done in the time point when UL grant for the PDCP SDU is sent to the UE. This allows for keeping the UE implementation complexity at an acceptable level while still providing high precision of the measured average PDCP SDU delay in UL.

According to an embodiment, the UE measures the UL retention delay (or so-called latency) of the PDCP SDU per QCI using the following formula: T_ULdelay QCIx(i) =t_Grant QCIx(i)−t_Arrival QCIx(i), where t_Grant QCIx (i) is the time when the UE receives the first UL grant for PDCP SDU (i) with the QCIx, and t_Arrival QCIx(i) is the time when PDCP SDU (i) with the QCIx arrives at PDCP upper SAP.

In an embodiment, the eNB measures the UL delay related to UL coverage and interference issues using the following formula: T_eNB ULdelay QCIx(i)=t_Last Piece QCIx(i)− t_Grant QCIx(i), where t_Grant QCIx(i) is the time when the when eNB sends the first UL grant for PDCP SDU (i) with the QCIx to UE (eNB sends this grant to UE and thus knows the time), and t_Last Piece QCIx(i) is the time when last piece of the PDCP SDU (i) with the QCIx has been successfully HARQ ACK by eNB. It is noted that the time represented by t_Grant QCIx(i) is not equal to the time when the UE receives the first UL grant for PDCP SDU (i) with the QCIx as an additional time period Δ is needed the UE receives this UL grant. Therefore this time can be expressed as t_Grant QCIx(i)−$\Delta_i$.

According to one embodiment, at the end of measurement period, the eNB calculates an averaged UL PDCSP SDU delay per QCI as follows: Sum(T_ULdelay QCIx(i))+sum (T_eNB ULdelay QCIx(i)) over all the UEs and PDCP SDU frames with the QCIx characteristic and divide this value with the number of PDCP SDUs with QCIx in UL direction. The sum(T_ULdelay QCIx(i))+sum(T_eNB ULdelay QCIx (i)) can be expressed as sum(t_Grant QCIx(i)−t_Arrival QCIx(i))+sum(t_Last Piece QCIx(i)−t_Grant QCIx(i)+$\Lambda_i$) which leads to sum(t_Last Piece QCIx(i)−t_Arrival QCIx (i)+which is divided with the total number of the PDCP SDUs with QCIx in UL direction. It means that there is a positive error in the average PDCP SDU Delay represented with the time period Δ needed the UE receives the UL grant. But this time period is very short and thus such an addition could be ignored and would not significantly impact the precision of the obtained results.

In certain embodiments, the UE may report either Sum (T_ULdelay QCIx(i)) or may report even average but then in addition also the number of PDCP SDUs with the QCIx that were sent in UL direction in the observed cell. In another embodiment, the number of PDCP SDUs with the QCIx in UL reported by the UE may be skipped as the eNB knows this number but would mean additional complexity for the eNB to keep the number of the PDCP SDUs per each UE.

As an option, in one embodiment, to resolve the time period Δ mentioned above, the averaged UL PDCSP SDU delay calculated by the eNB may further subtract the average $N_{TA}$ (see 3GPP TS 36.213) of all UEs in the cell.

FIG. 1 illustrates an example flow diagram of a method, according to one embodiment of the invention. The method of FIG. 1 may be performed by a UE or mobile device, for example. In one embodiment, the UE may be camped on the same cell during the whole reporting cycle period. In other embodiments, the UE may be camped in different cells and the reporting is done for all the cells separately to measure the delay per each cell.

As illustrated in the example of FIG. 1, the start of the reporting cycle occurs at 100. The method may include, at 110, checking for the arrival of a new PDCP SDU (i) with the QCIx at PDCP upper service access point (SAP). If it is determined that a new PDCP SDU (i) has arrived, then the method includes, at 120, memorizing or storing the time of arrival (t_Arrival QCIx(i)). If it is determined that no new PDCP SDU (i) has arrived, then the method repeats step 110. It is noted that, despite the UE sending a scheduling request (SR) to inform the eNB that there is some data to be transmitted in UL per logical channel group (LCG) (not per QCI) and the eNB sending back the UL grant for the LCG, the UE knows the QCI of the PDCP SDU and therefore can assign this time of arrival to the QCI characteristic.

The method of FIG. 1 continues, at 130, by checking whether a UL grant has been received for the PDCP SDU (i) with the QCIx. If it is determined that a UL grant has been received, then the method includes, at 140, memorizing or storing the time of receipt of the grant (t_Grant QCIx(i)). If it is determined that a UL grant has not been received, then the method repeats step 130.

In an embodiment, the method may then include, at 150, calculating the UL retention delay based on the time of receipt of the grant and the time of arrival of the PDCP SDU. According to one embodiment, the calculating of the UL retention delay may be calculated according to the following equation: T_ULdelay QCIx(i)=t_Grant QCIx(i)−t_Arrival QCIx(i).

At 160, the method checks for the end of the reporting cycle. If it is not the end of the reporting cycle, the method returns to step 110. If it is determined that it is the end of the reporting cycle, then the method proceeds to step 170 where the UE reports the sum of all retention delay periods (T_ULdelay QCIx(i)) for all the transmitted PDCP SDUs in UL direction for the QCIx.

Figure 2:
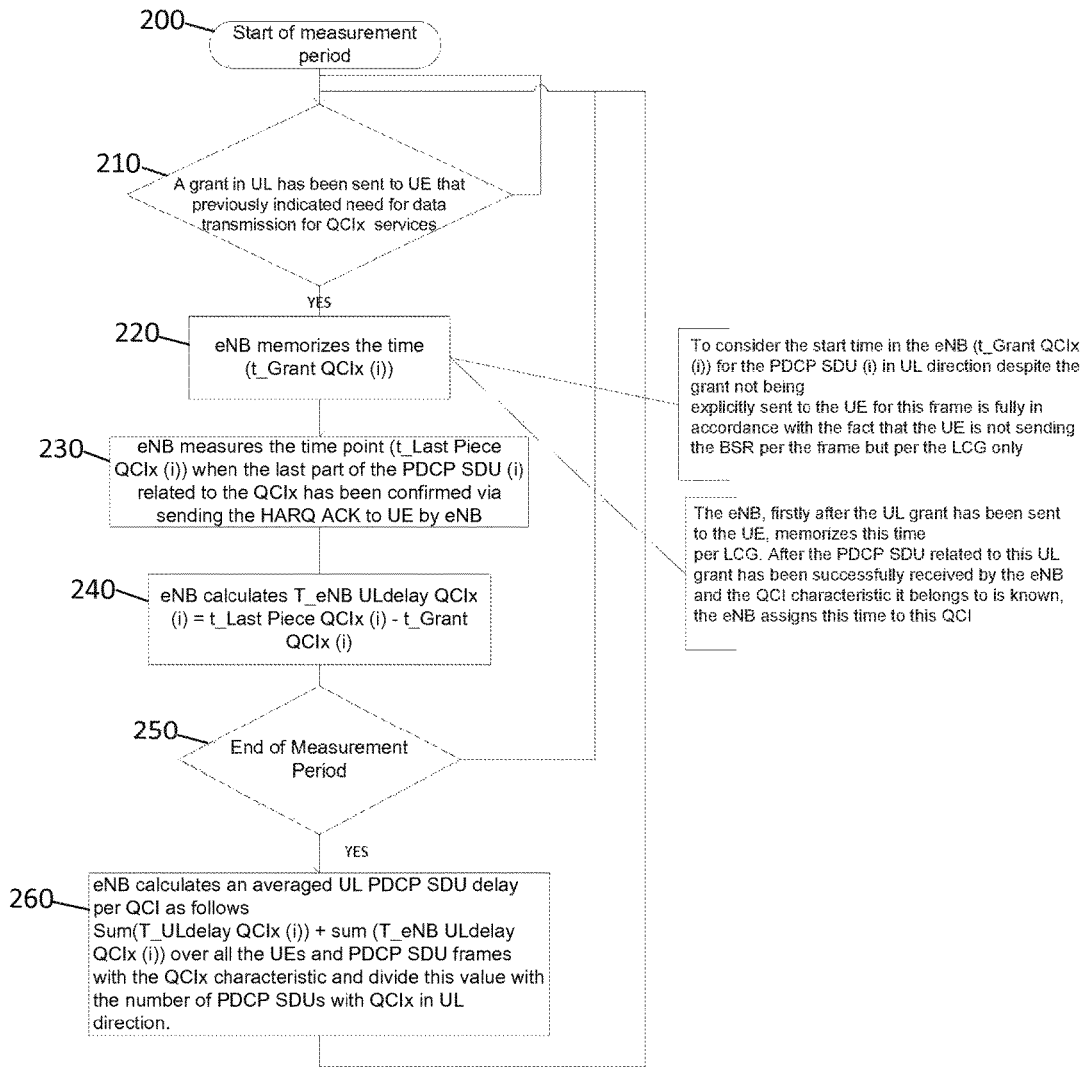
FIG. 2 illustrates a flow diagram of a method according to another embodiment.

FIG. 2 illustrates an example flow diagram of a method, according to another embodiment of the invention. The method of FIG. 2 may be performed by a eNB, base station, or access point, for example. As illustrated in the example of FIG. 2, the start of the measurement period occurs at 200. The method may include, at 210, checking whether a grant in UL has been sent to a UE that previously indicated need for data transmission for QCIx services. If it is determined that a UL grant has been sent so the UE, the method includes, at 220, memorizing or storing the time of grant (t_Grant QCIx(i)). If it is determined that a UL grant has not been sent, then the method repeats step 210. According to an embodiment, after the UL grant has been sent to the UE, the eNB memorizes/stores the UL grant time per LCG. After the PDCP SDU related to this UL grant has been successfully received by the eNB and the QCI characteristic it belongs to is known, the eNB assigns this time to this QCI. It is noted that to consider the start time in the eNB (t_Grant QCIx(i)) for the PDCP SDU (i) in UL direction despite the grant being not explicitly sent to the UE for this frame is in accordance with the fact that the UE is not sending the BSR per the frame but per the LCG.

At 230, the method includes measuring the time point (t_Last Piece QCIx(i)) when the last part of the PDCP SDU (i) related to the QCIx has been confirmed via sending the HARQ ACK to the UE by the eNB. The method may then include, at 240, calculating the UL delay based on the time point and the time of grant. For example, the calculating of the UL delay may be calculated according to the following equation: T_eNB Undelay QCIx (i)=t_Last Piece QCIx(i)−t_Grant QCIx(i).

At 250, the method checks for the end of the measurement period. If it is not the end of the measurement period, the method returns to step 210. If it is determined that it is the end of the measurement period, then the method proceeds to step 260 where the eNB calculates an averaged UL PDCP SDU delay per QCI as follows: Sum(T_ULdelay QCIx(i))+Sum(T_eNB ULdelay QCIx(i)) over all the UEs and PDCP SDU frames with the QCIx characteristic and divide this value with the number of PDCP SDUs with QCIx in UL direction.

Figure 3A:
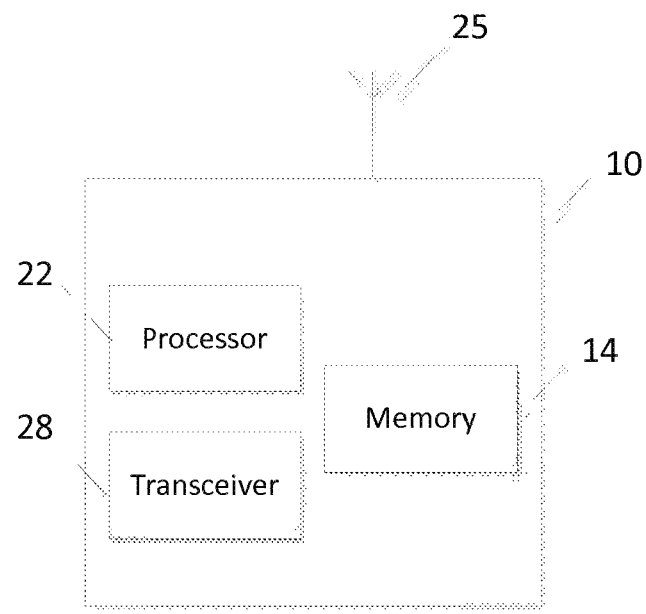
FIG. 3a illustrates a block diagram of an apparatus according to one embodiment.

FIG. 3a illustrates an example of an apparatus 10 according to an embodiment. In an embodiment, apparatus 10 may be a node, host, or server in a communications network or associated with such a network. For example, in certain embodiments, apparatus 10 may be a network node or device in a radio access network, such as a mobile device or UE. In certain embodiments, the radio access network may be an LTE, LTE-A, or 5G network. It should be noted that one of ordinary skill in the art would understand that apparatus 10 may include components or features not shown in FIG. 3a.

As illustrated in FIG. 3a, apparatus 10 includes a processor 22 for processing information and executing instructions or operations. Processor 22 may be any type of general or specific purpose processor. While a single processor 22 is shown in FIG. 3a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, or removable memory. For example, memory 14 may be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

As mentioned above, in one embodiment, apparatus 10 may be a network node, such as a mobile device or UE. According to an embodiment, apparatus 10 may be controlled by memory 14 and processor 22 to, when a PDCP SDU (i) with a CQIx arrives at PDCP upper SAP, retain or store the time of arrival (t_Arrival QCIx(i)) of the PDCP SDU (i). Apparatus 10 may then be controlled by memory 14 and processor 22 to check whether a UL grant has been received from the PDCP SDU (i) with the QCIx. If the UL grant has been received, apparatus 10 may be controlled by memory 14 and processor 22 to retain and/or store the time of receipt of the UL grant (t_Grant QCIx(i)). In an embodiment, apparatus 10 may be further controlled by memory 14 and processor 22 to calculate UL retention delay based on the time of receipt of the UL grant and the time of arrival of the PDCP SDU (i). According to one embodiment, apparatus 10 may calculate the UL retention delay according to the following equation: T_ULdelay QCIx(i)=t_Grant QCIx(i)−t_Arrival QCIx(i). When the end of the reporting cycle is reached, apparatus 10 may be controlled by memory 14 and processor 22 to report, to an eNB, the sum of all retention delay periods (T_ULdelay QCIx(i)) for all the transmitted PDCP SDUs in UL direction for the QCIx.

Figure 3B:
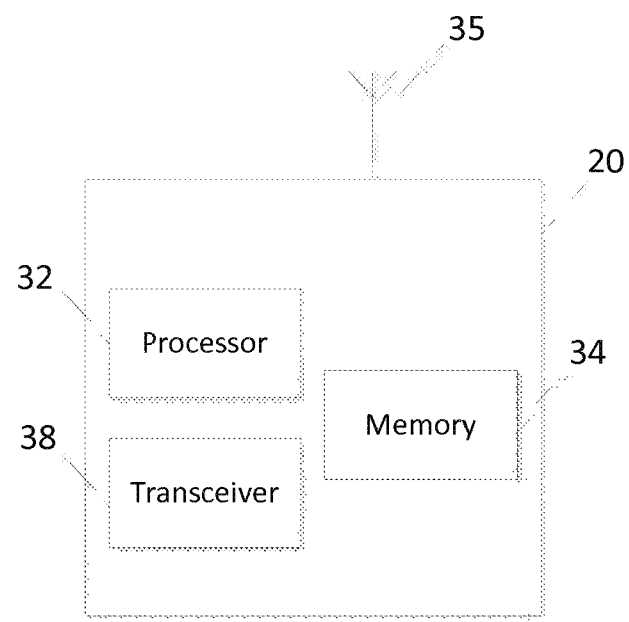
FIG. 3b illustrates a block diagram of an apparatus according to another embodiment.

FIG. 3b illustrates an example of an apparatus 20 according to another embodiment. In an embodiment, apparatus 20 may be a node, host, or server in a communications network or serving such a network. For example, in certain embodiments, apparatus 20 may be a network entity or control entity for a radio access network, such as an LTE, LTE-A, or 5G network. In certain embodiments, apparatus 20 may be a base station or eNB. It should be noted that one of ordinary skill in the art would understand that apparatus 20 may include components or features not shown in FIG. 3*b*.

As illustrated in FIG. 3*b*, apparatus 20 includes a processor 32 for processing information and executing instructions or operations. Processor 32 may be any type of general or specific purpose processor. While a single processor 32 is shown in FIG. 3*b*, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 may be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a network entity, such as a base station or eNB. In this embodiment, apparatus 20 may be controlled by memory 34 and processor 32 to send (or check whether) a grant in UL to a UE that previously indicated need for data transmission for QCIx services. Apparatus 20 may then be controlled by memory 34 and processor 32 to retain or store the time of the grant (t_Grant QCIx(i)), and to measure the time point (t_Last Piece QCIx(i)) when a last part of PDCP SDU (i) related to the QCIx has been confirmed via sending HARQ ACK to the UE by the apparatus 20.

In an embodiment, apparatus 20 may be controlled by memory 34 and processor 32 to calculate UL delay based on the measured time point and the time of grant. According to one embodiment, apparatus 20 may calculate the UL delay according to the following equation: T_eNB ULdelay QCIx(i)=t_Last Piece QCIx(i)−t_Grant QCIx(i). According to one embodiment, apparatus 20 may be further controlled by memory 34 and processor 32 to calculate an averaged UL PDCP SDU delay per QCI as follows: Sum(T_ULdelay QCIx(i))+sum(T_eNB ULdelay QCIx(i)) over all the UEs and PDCP SDU frames with the QCIx characteristic and divide this value with the number of PDCP SDUs with QCIx in UL direction.

Figure 4A:
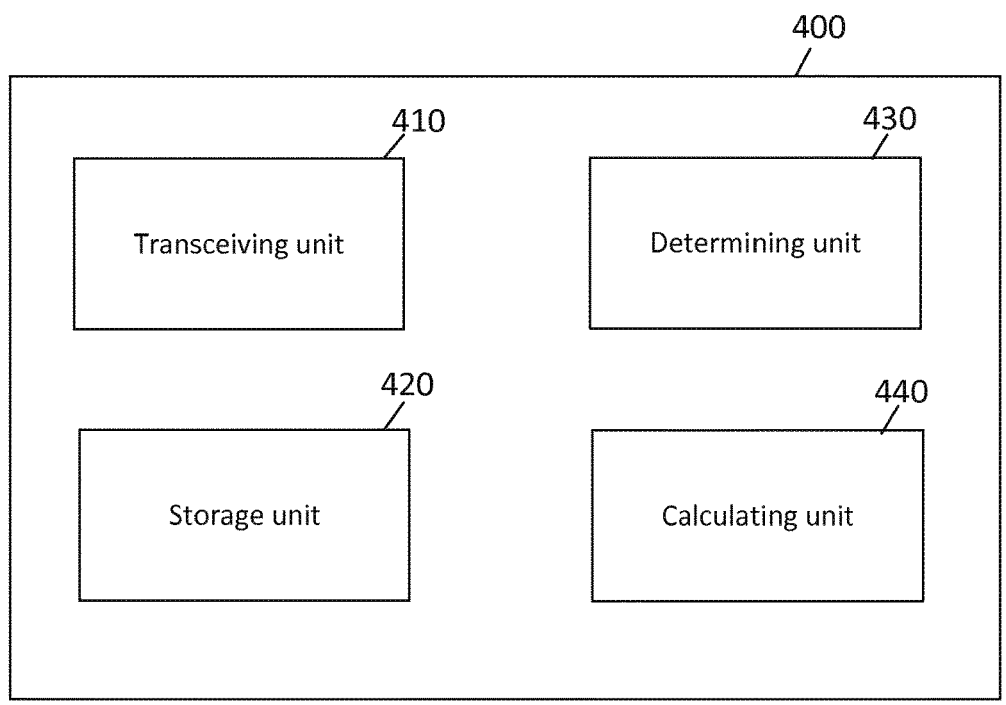
FIG. 4a illustrates a block diagram of an apparatus according to one embodiment.

FIG. 4*a* illustrates an example block diagram of an apparatus 400, according to another embodiment. In certain embodiments, apparatus 400 may be a mobile device or UE, for example. As illustrated in the example of FIG. 4*a*, apparatus 400 may include a transceiving unit or means 400 for receiving or transmitting information, a storage unit or means 420, a determining unit or means 430, and a calculating unit or means 440.

In one embodiment, when a PDCP SDU (i) with a QCIx arrives at PDCP upper SAP, storage unit 420 may retain or store the time of arrival (t_Arrival QCIx(i)) of the PDCP SDU (i). Determining unit 430 may then check whether a UL grant has been received from the PDCP SDU (i) with the CQIx. If the UL grant has been received, storage unit 420 may retain and/or store the time of receipt of the UL grant (t_Grant QCIx(i)). In an embodiment, calculating unit 440 may calculate UL retention delay based on the time of receipt of the UL grant and the time of arrival of the PDCP SDU (i). According to one embodiment, calculating unit 440 may calculate the UL retention delay according to the following equation: T_ULdelay QCIx(i)=t_Grant QCIx(i)−t_Arrival QCIx(i). When the end of the reporting cycle is reached, transceiving unit 410 may report, to an eNB, the sum of all retention delay periods (T_ULdelay QCIx(i)) for all the transmitted PDCP SDUs in UL direction for the QCIx.

Figure 4B:
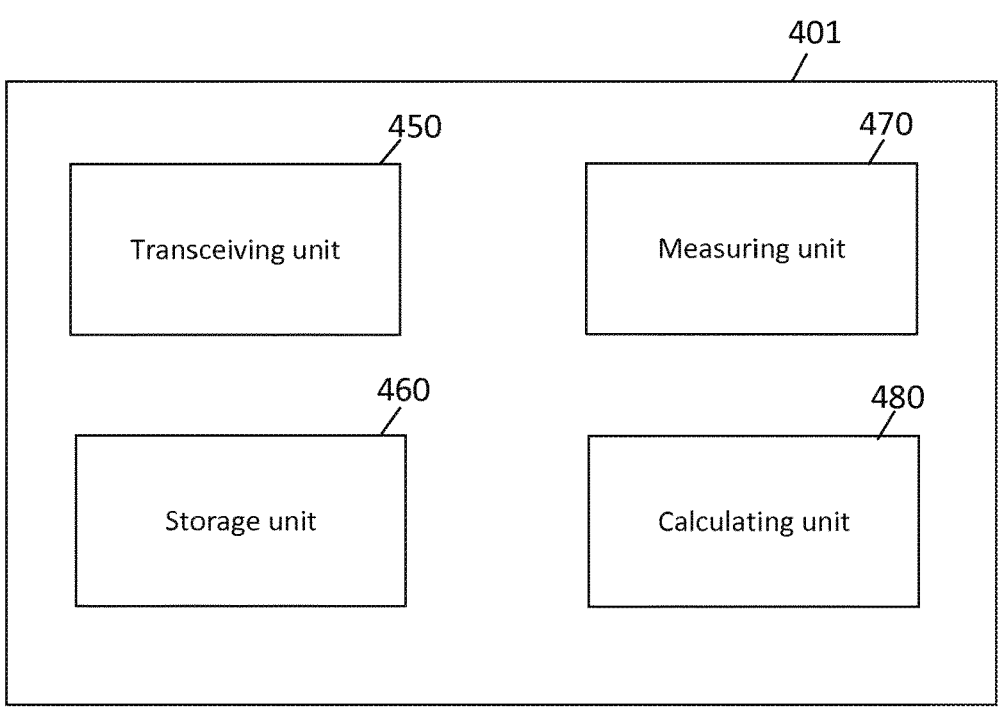
FIG. 4b illustrates a block diagram of an apparatus according to another embodiment.

FIG. 4*b* illustrates an example block diagram of an apparatus 401, according to another embodiment. In certain embodiments, apparatus 401 may be a base station or eNB, for example. As illustrated in the example of FIG. 4*b*, apparatus 401 may include a transceiving unit or means 450 for receiving or transmitting information, a storage unit or means 460, a measuring unit or means 470, and a calculating unit or means 480.

According to an embodiment, transceiving unit 450 may send (or check whether) a grant in UL to a UE that previously indicated need for data transmission for QCIx services. Storage unit 460 may retain or store the time of the grant (t_Grant QCIx(i)), and measuring unit 470 may measure the time point (t_Last Piece QCIx(i)) when a last part of PDCP SDU (i) related to the QCIx has been confirmed via sending HARQ ACK to the UE by the apparatus 401. In an embodiment, calculating unit 480 may calculate UL delay based on the measured time point and the time of grant. According to one embodiment, calculating unit 480 may calculate the UL delay according to the following equation: T_eNB ULdelay QCIx(i)=t_Last Piece QCIx(i)−t_Grant QCIx(i). According to one embodiment, calculating unit 480 may further calculate an averaged UL PDCP SDU delay per QCI as follows: Sum(T_ULdelay QCIx(i))+sum(T_eNB ULdelay QCIx(i)) over all the UEs and PDCP SDU frames with the QCIx characteristic and divide this value with the number of PDCP SDUs with QCIx in UL direction.

According to embodiments, programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of any method or apparatus described herein may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that may be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
sending, by a network node, a grant in uplink to a user equipment that previously indicated a need for data transmission for quality of service (QoS) class identifier (QCI) services;
storing, by the network node, a time of the uplink grant to the user equipment;
measuring, by the network node, a time point when a last part of a packet data convergence protocol (PDCP) serving data unit (SDU) related to the quality of service (QoS) class identifier (QCI) services has been confirmed by sending an acknowledgement to the user equipment; and
calculating, by the network node, an uplink delay based on the measured time point and the time of the uplink grant.

2. The method according to claim 1, wherein the calculating comprises calculating the uplink delay according to the following equation: T_eNB ULdelay QCIx(i)=t_Last Piece QCIx(i)−t_Grant QCIx(i), where T_eNB ULdelay QCIx(i) represents the uplink delay, t_Last Piece QCIx(i) represents the the measured time point, and t_Grant QCIx(i) represents the time of uplink grant.

3. The method according to claim 2, further comprising calculating an averaged uplink packet data convergence protocol (PDCP) serving data unit (SDU) delay per quality of service (QoS) class identifier (QCI) as follows: Sum (T_ULdelay QCIx(i))+sum(T_eNB ULdelay QCIx(i)) over all user equipment served by the network node and packet data convergence protocol (PDCP) serving data unit (SDU) frames with the quality of service (QoS) class identifier (QCI) characteristic, and dividing the resulting value by a number of packet data convergence protocol (PDCP) serving data unit (SDU) with the quality of service (QoS) class identifier (QCI) services in the uplink direction.

4. An apparatus, comprising:
at least one processor; and
at least one memory including computer program code, wherein the at least one memory and computer program code are configured, with the at least one processor, to cause the apparatus at least to
send a grant in uplink to a user equipment that previously indicated a need for data transmission for quality of service (QoS) class identifier (QCI) services;
store a time of the uplink grant to the user equipment;
measure a time point when a last part of a packet data convergence protocol (PDCP) serving data unit (SDU) related to the quality of service (QoS) class identifier (QCI) services has been confirmed by sending an acknowledgement to the user equipment; and
calculate an uplink delay based on the measured time point and the time of the uplink grant.

5. The apparatus according to claim 4, wherein the at least one memory and computer program code are configured, with the at least one processor, to cause the apparatus to calculate the uplink delay according to the following equation: T_eNB ULdelay QCIx(i)=t_Last Piece QCIx(i)−t_Grant QCIx(i), where T_eNB ULdelay QCIx(i) represents the uplink delay, t_Last Piece QCIx(i) represents the the measured time point, and t_Grant QCIx(i) represents the time of uplink grant.

6. The apparatus according to claim 5, wherein the at least one memory and computer program code are further configured, with the at least one processor, to cause the apparatus to calculate an averaged uplink packet data convergence protocol (PDCP) serving data unit (SDU) delay per quality of service (QoS) class identifier (QCI) as follows: Sum(T_ULdelay QCIx(i))+sum(T_eNB ULdelay QCIx(i))

over all user equipment served by the apparatus and packet data convergence protocol (PDCP) serving data unit (SDU) frames with the quality of service (QoS) class identifier (QCI) characteristic, and divide the resulting value by a number of packet data convergence protocol (PDCP) serving data unit (SDU) with the quality of service (QoS) class identifier (QCI) services in the uplink direction.

7. The apparatus according to claim 4, wherein the apparatus comprises an evolved node B (eNB).

\* \* \* \* \*